Dec. 22, 1959 A. R. DENZ 2,918,627

TEMPERATURE-COMPENSATED DIRECT-CURRENT AMPLIFIER

Filed Nov. 30, 1954

2,918,627

TEMPERATURE-COMPENSATED DIRECT-CURRENT AMPLIFIER

Arthur R. Denz, Chicago, Ill., assignor to International Telephone and Telegraph Corporation, New York, N.Y., a corporation of Maryland Application November 30, 1954, Serial No. 472,109

3 Claims. (Cl. 330—13)

This invention relates to a temperature-compensated direct-current amplifier, and more particularly to a direct-current amplifier employing transistors. Its object is to provide a direct-current transistor amplifier which compensates for the tendency of a transistor therein to alter the output current according to the temperature of the transistor.

Heretofore, when a transistor has been employed as the current-amplifying member of a direct-current amplifier, it has been found necessary to maintain the temperature of the transistors substantially constant to avoid temperature-induced variations in the direct-current output, arising from internal resistance variations of the transistor at the collector and/or the emitter junction, or barrier. The resistance at either such point drops exponentially with a rise in temperature as from substantially below to substantially above a nominal room temperature of 20° C. With a grounded-emitter type of direct-current transistor amplifier, which gives a much larger current gain than a grounded-base type, the constant-temperature requirements have been particularly severe because of the well-known regenerative characteristic of a grounded-emitter amplifier.

According to the invention, the necessity for maintaining a constant transistor temperature is avoided by employing two transistors at an amplifying stage in a circuit configuration wherein the resistance variations and consequent variations of output current of one transistor with a temperature change are compensated for by the simultaneous variations in the other transistor, to the end that the combined output current from the two transistors is independent of temperature over a wide range, of temperature variations. In the preferred form, a NPN transistor and a PNP transistor are connected as adjacent arms of a bridge, with a resistor connected between the respective collector terminals and having a sliding center tap as the other two arms. The two transistors are chosen to have similar cut-off current versus temperature characteristics, and similar grounded emitter current gain. When temperature increases, the cut-off current of both transistors increases. Output is taken from the bridge diagonal between the connection to the two transistors and the slider of the resistor. The slider is adjusted for zero output with zero input. With a selection of transistors of moderately similar characteristics a very high degree of temperature compensation can be obtained.

The foregoing and other objects and features of this invention and the manner of attaining them will become more apparent and the invention itself will be best understood, by reference to the following description of an embodiment of the invention taken in conjunction with the accompanying drawings comprising Figs. 1 to 3, wherein.

Figure 1:
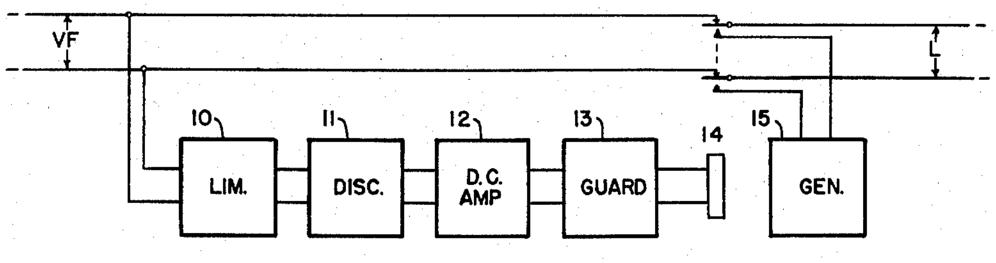
Fig. 1 shows an application of the direct-current amplifier in a signal converter for repeating signals from a voice-frequency telephone or telegraph line to a local line.

*Fig. 1.—General arrangement*

The signal converter shown in Fig. 1 illustrates one use of the invention.

A line VF, which will pass voice frequencies but not low frequency signals, is shown connected through the back contacts of relay 14 to local line L, which will pass both voice frequencies and low-frequency signals. Ringing and like signals are received from line VF at a frequency within the voice frequency range, are detected by limiter 10, and are converted to direct current by discriminator 11. The signals then pass through direct current amplifier 12 to guard circuit 13. The guard circuit 13 prevents response to short bursts of signal at the ringing frequency. If the ringing signal persists for a short period, guard circuit 13 operates and closes a circuit for relay 14. At the front contacts of relay 14, low frequency ringing current from generator 15 is connected to local line L.

Figure 2:
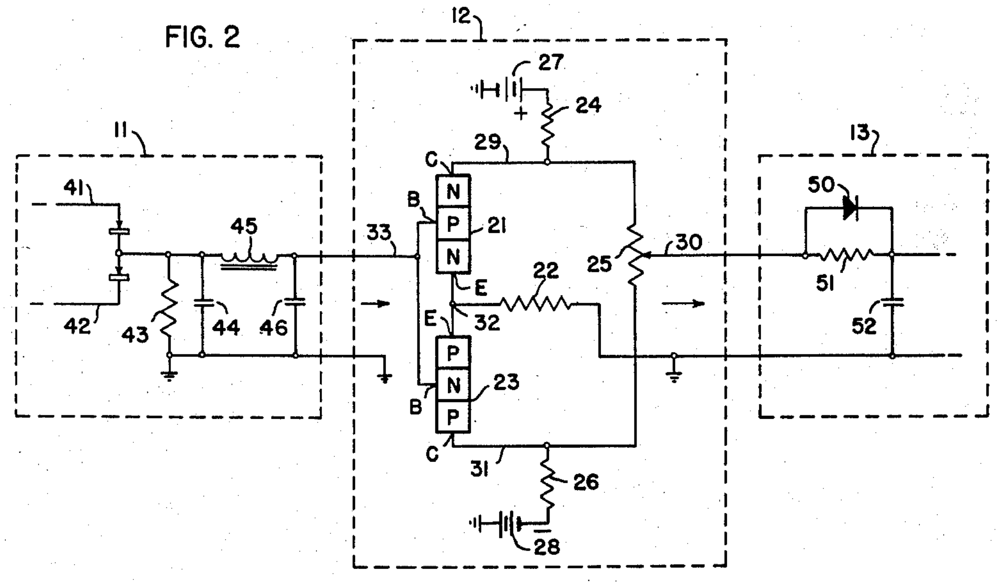
Fig. 2 shows the amplifier in circuit detail.

*Fig. 2.—Preferred form*

Referring to Fig. 2, the direct current amplifier is shown in circuit detail, along with portions of the limiter and discriminator circuit 11, and the guard circuit 13. The amplifier is a bridge comprising NPN transistor 21, PNP transistor 23, and the two arms of resistor 25. The collector of transistor 21 and the upper end of resistor 25 are connected through resistor 24 to the positive pole of battery 27; and the collector of transistor 23 and the lower end of resistor 25 are connected through resistor 26 to the negative pole of battery 28. The emitters of the two transistors are connected together through wire 32 and through resistor 22 to ground. Input to ground from the discriminator 11 is supplied at wire 33 to the bases of the two transistors in parallel. The output through guard circuit 13 to ground, and thence in series with resistor 22, is taken from the diagonal between the slider 30 of resistor 25 and the wire 32 connecting the emitters of the two transistors. Resistor 22 is in both the input and output circuits and therefore provides negative feedback, and also increases the input impedance.

With zero signal input, cutoff or leakage current flows through the collector diode of each transistor, and thence through the emitter diodes to wire 32. The slider 30 is adjusted to obtain zero output, or any desired direct-current value. With an increase in temperature, the internal resistance decreases and the cutoff current increases in each transistor. Therefore the output, being in the bridge diagonal, remains substantially constant.

The output of the discriminator 11 is represented by paths 41 and 42 and resistor 43, connected through filter 44, 45, 46 to the input of amplifier 12 at wire 33.

The input of guard circuit 13 includes a timing condenser 52 charged through resistor 51 from the output at slider 30 of amplifier 12, with a diode 50 for rapid discharge.

When the signals on line VF are at the ringing frequency, positive output is obtained from the discriminator 11 through path 41 and applied at wire 33 to the bases of transistors 21 and 23. The effective resistance is decreased in transistor 21 and increased in transistor 23. With the bridge unbalanced, slider 30 becomes negative with respect to ground. Timing condenser 52 charges to a negative potential.

When the signals on line VF are outside the ringing frequency band, output from discriminator 11 is zero or negative through path 42. With negative potential on wire 33 to the transistor bases, the effective resistance is increased in transistor 21 and decreased in transistor 23, resulting in positive output at slider 30. Condenser 52 discharges through diode 50 and amplifier circuit 12. A diode (not shown) in guard circuit 13 prevents condenser 52 from charging positive.

During periods of zero output, condenser 52 also discharges through diode 50 and amplifier circuit 12.

Thus with an input signal between wire 33 and ground, an amplified and phase-reversed signal appears at the output terminals between slider 30 and ground.

Figure 3:
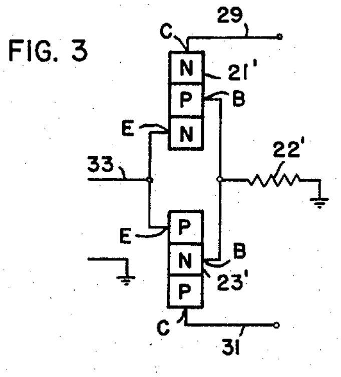
Fig. 3 shows a modification of a portion of the amplifier circuit.

*Fig. 3.—Modified form*

Fig. 3 shows a modification of the circuit of the direct-current amplifier, with transistors 21′ and 23′ connected as grounded base amplifiers. Input is connected on wire 33 to the emitters of the transistors in parallel, and wires 29 and 31 from the respective collectors are connected to the bridge terminals as shown in Fig. 2. The bases are connected together and through resistor 22′ to ground.

The circuit operation is similar to that of Fig. 2, except that the input impedance is substantially lower.

While I have described above the principles of my invention in connection with specific apparatus, it is to be clearly understood that this description is made only by way of example and not as a limitation to the scope of my invention.

I claim:

1. A temperature-compensated direct-current transistor amplifier comprising two transistors of opposite conductivity types, each transistor having emitter, base, and collector terminals, with an emitter diode between the emitter and base terminals and a collector diode between the collector and base terminals, each transistor being of the type wherein the resistance of its emitter diode varies with temperature and the resistance of its collector diode varies with temperature and with variations in current through its emitter diode, a source of direct-current signals connected to a direct-current input circuit path through both emitter diodes in parallel and having a connection to a reference ground, resistance means connected between the collector terminals, a tap on the resistance means, a direct-current load device connected between the tap and reference ground, a supply source of direct current connected between the collector terminals, the supply source having an intermediate tap connected to reference ground, means including the emitter diodes and the input circuit path for causing the collector-diode resistance of either transistor to rise with such change in input current as causes the collector-diode resistance of the other transistor to fall, and means including the supply source for driving an output direct current through the load device which depends upon the difference between the resistances of the collector diodes of the transistors.

2. A temperature-compensated direct-current transistor amplifier according to claim 1, wherein the said base terminals are connected directly together and through a direct-current path to one side of the said source of signals, and the said emitter terminals are connected directly together and through a direct-current path to the other side of the said source of signals.

3. In a temperature-compensated direct-current transistor amplifier according to claim 1, means for adjusting the said resistance means to balance to obtain zero output current at a given input-current condition, and means for obtaining an output signal potential at the said tap of either polarity depending upon the input signal current condition.

References Cited in the file of this patent

UNITED STATES PATENTS

| | | |
|---|---|---|
| 2,070,071 | Stromeyer | Feb. 9, 1937 |
| 2,441,334 | Sayer | May 11, 1948 |
| 2,542,160 | Stoner et al. | Feb. 20, 1951 |
| 2,666,818 | Shockley | Jan. 19, 1954 |

OTHER REFERENCES

Shea text, Principles of Transistor Circuits, page 351, Figure 16.10, published 1953 by John Wiley and Sons Inc., New York.

G. C. Sziklai: article in Electronic Engineering, page 359, Figure 5, September 1953.

Lohman: "Complementary Symmetry Transistor Circuits," Electronics, September 1953, pp. 140–143.